US010027702B1

(12) United States Patent
Oliver

(10) Patent No.: US 10,027,702 B1
(45) Date of Patent: Jul. 17, 2018

(54) IDENTIFICATION OF MALICIOUS SHORTENED UNIFORM RESOURCE LOCATORS

(71) Applicant: Trend Micro Incorporated, Tokyo (JP)

(72) Inventor: Jonathan James Oliver, Kew (AU)

(73) Assignee: Trend Micro Incorporated, Tokyo (JP)

(*) Notice: Subject to any disclaimer, the term of this patent is extended or adjusted under 35 U.S.C. 154(b) by 623 days.

(21) Appl. No.: 14/304,001

(22) Filed: Jun. 13, 2014

(51) Int. Cl.
*H04L 29/06* (2006.01)

(52) U.S. Cl.
CPC .............. *H04L 63/1441* (2013.01)

(58) Field of Classification Search
CPC ......... H04L 29/12018; H04L 29/12047; H04L 63/30; H04L 29/06585; H04L 29/1215
See application file for complete search history.

(56) References Cited

U.S. PATENT DOCUMENTS

| 7,021,534 | B1 | 4/2006 | Kiliccote |
| 7,590,707 | B2 | 9/2009 | McCloy, III et al. |
| 7,802,298 | B1 | 9/2010 | Hong et al. |
| 7,809,796 | B1 * | 10/2010 | Bloch ............ G06Q 10/107 709/206 |
| 7,854,001 | B1 | 12/2010 | Chen et al. |
| 7,984,500 | B1 | 7/2011 | Khanna et al. |
| 8,381,292 | B1 | 2/2013 | Warner et al. |
| 8,468,597 | B1 | 6/2013 | Warner et al. |
| 8,495,735 | B1 | 7/2013 | Warner et al. |
| 8,862,675 | B1 * | 10/2014 | Coomer ............ H04L 51/12 370/349 |
| 2005/0160330 | A1 | 7/2005 | Embree et al. |
| 2006/0041508 | A1 | 2/2006 | Pham et al. |
| 2006/0064374 | A1 | 3/2006 | Helsper et al. |
| 2006/0070126 | A1 | 3/2006 | Grynberg et al. |
| 2006/0080735 | A1 | 4/2006 | Brinson et al. |
| 2006/0101120 | A1 | 5/2006 | Helsper et al. |
| 2006/0123464 | A1 | 6/2006 | Goodman et al. |
| 2006/0123478 | A1 | 6/2006 | Rehfuss et al. |
| 2006/0168066 | A1 | 7/2006 | Helsper et al. |
| 2007/0112814 | A1 | 5/2007 | Chesshire |
| 2007/0118904 | A1 | 5/2007 | Goodman et al. |
| 2007/0282739 | A1 | 12/2007 | Thomsen |

(Continued)

OTHER PUBLICATIONS

Lee et al., WARNINGBIRD: A Near Real-time Detection System for Suspicious URLs in Twitter Stream, IEEE Transactions on Dependable and Secure Computing vol. 10, No. 3, May/Jun. 2013, pp. 183-195.*

(Continued)

*Primary Examiner* — Hadi S Armouche
*Assistant Examiner* — Paul E Callahan
(74) *Attorney, Agent, or Firm* — Okamoto & Benedicto LLP

(57) ABSTRACT

Malicious shortened uniform resource locators are identified by collecting online messages in a computer. Senders and uniform resource locators are extracted from the collected online messages. Sender controlled components are identified in the uniform resource locators. Groups of sender controlled components and senders are formed. Shortened uniform resource locators associated with sender controlled components that are members of malicious groups are identified as malicious.

20 Claims, 7 Drawing Sheets

(56) References Cited

U.S. PATENT DOCUMENTS

| | | |
|---|---|---|
| 2008/0028444 A1 | 1/2008 | Loesch et al. |
| 2008/0034073 A1 | 2/2008 | McCloy et al. |
| 2008/0082662 A1 | 4/2008 | Dandliker et al. |
| 2008/0133540 A1 | 6/2008 | Hubbard et al. |
| 2010/0095378 A1 | 4/2010 | Oliver et al. |
| 2011/0167474 A1 | 7/2011 | Sinha et al. |
| 2012/0222111 A1 | 8/2012 | Oliver et al. |
| 2012/0227104 A1 | 9/2012 | Sinha et al. |
| 2013/0151526 A1* | 6/2013 | Jeong ............ H04L 67/22 707/737 |

OTHER PUBLICATIONS

Seems Somebody is Clicking on That Spam—New York Times, Jul. 3, 2006, 1 sheet [retrieved on Jun. 2, 2014], retrieved from the Internet: http://www.nytimes.com/2006/07/03/technology/03drill.html.

Does the Twitter Follower Scam Actually Work / Security Intelligence Blog / Trend Micro, Jan. 30, 2014, 4 sheets [retrieved on Jun. 2, 2014], retrieved from the internet: http://blog.trendmicro.com/trendlabs-security-intelligence/does-the-twitter-follower-scam-actually-work/.

Clique problem—Wikipedia, the free encyclopedia, 11 sheets [retrieved on Jun. 2, 2014], retrieved from the internet: http://en.wikipedia.org/wiki/Clique_problem.

Bipartite graph—Wikipedia, the free encyclopedia, 9 sheets [retrieved on Jun. 2, 2014], retrieved from the internet: http://en.wikipedia.org/wiki/Bipartite_graph.

Spam ROI: Profit on 1 in 12.5m Response Rate, Nov. 11, 2008, 5 sheets [retrieved on Jun. 2, 2014], retrieved from the Internet: http://www.sitepoint.com/spam-roi-profit-on-1-in-125m-response-rate/.

Trend Micro Simply Security Checking Identities in Social Network Friend Requests, Feb. 28, 2013, 5 sheets [retrieved on Jun. 2, 2014], retrieved from the Internet: http://blog.trendmicro.com/checking-identities-in-facebook-friend-request/.

Facebook to put Report Abuse button at fingertips of bullying victims / Naked Security, Nov. 6, 2013, 3 sheets [retrieved on Jun. 2, 2014], retrieved from the internet: http://nakedsecurity.sophos.com/2013/11/06/facebook-to-put-report-abuse-button-at-fingertips-of-bullying-victims/.

Twitter rolls out 'report abuse' button for individual tweets: will you use it?, 4 sheets [retrieved on Jun. 2, 2014], retrieved from the Internet: http://www.theguardian.com/technology/blog/2013/aug/30/twitter-report-abuse-button.

Honeypot (computing)—Wikipedia, the free encyclopedia, 4 sheets [retrieved on Jun. 2, 2014], retrieved from the Internet: http://en.wikipedia.org/wiki/Honeypot_(computing).

URL shortening-Abuse—Wikipedia, the free encyclopedia, 1 sheet [retrieved on Jun. 5, 2014], retrieved from the Internet: http://en.wikipedia.org/wiki/URL_shortening_-_Abuse.

URL shortening—Wikipedia, the free encyclopedia, 7 sheets [retrieved on Jun. 5, 2014], retrieved from the internet: http://en.wikipedia.org/wiki/URL_shortening.

URL redirection—Wikipedia, the free encyclopedia,11 sheets [retrieved on Jun. 5, 2014], retrieved from the internet: http://en.wikipedia.org/wiki/URL_redirection.

E. Zangerle and G. Specht "Sorry, I was hacked": A Classification of Compromised Twitter Accounts, Mar. 2014, 7 sheets, retrieved from the Internet: http://www.evazangerle.at/wp-content/papercite-data/pdf/sac14.pdf.

J. Xiang, C. Guo and A. Aboulnaga "Scalable Maximum Clique Computation Using MapRedue", Jan. 2014, 12 sheets, retrieved from the Internet: https://cs.uwaterloo.ca/~ashraf/pubs/icde13maxclique.pdf.

C. Grier, K. Thomas, V. Paxson and M. Zhang "@spam: The Underground on 140 Characters or Less", Oct. 2010, 11 sheets, In Proceeding of the 17th ACM Conference on Computer and Communications Security, retrieved from the internet: http://www.icir.org/vern/papers/ccs2010-twitter-spam.pdf.

C. Kanich, C. Kreibich, K. Levchenko, B. Enright, G. Voelker, V. Paxson and S. Savage "Spamalytics: An Emperical Analysis of Spam Marketing Conversion" 2008, 12 sheets, In Proceeding of the 15th ACM Conference on Computer and Communications Security, retrieved from the Internet: http://www.icsi.berkeley.edu/pubs/networking/2008-ccs-spamalytics.pdf.

M. Egele, G. Stringhini, C. Kruegel and G. Vigna "COMPA: Detecting Comprimised Accounts on Social Networks", 2013, 17 sheets, retrieved from the Internet: http://www.cs.ucsb.edu/~gianluca/papers/thjp-ndss13.pdf.

Michael Steven Svendsen "Mining maximal cliques from large graphs using MapReduce", 2012, 45 sheets, retrieved from the internet: http://lib.dr.iastate.edu/cgi/viewcontent.cgi?article=3631&context=etd.

Yun-Chian Cheng "Hadoop Sucess Stories in Trend Micro SPN", Oct. 2012, 30 sheets, retrieved from the internet: http://www.gwms.com.tw/TREND_HadoopinTaiwan2012/1002download/04.pdf.

Chung-Tsai Su, S. Tsao, W. Chu and R. Liao "Mining Web Browsing Log by Using Relaxed Biclique Enumeration Algorithm in MapReduce", 2012, 47 sheets, vol. 3, IEEE/WIC/ACM International Conferences on Web Intelligence and Intelligent Agent Technology.

* cited by examiner

INITIALIZATION

A.    find a sender S who has sent a spam message M (M has a shortened URL)

B.    New_URLs = { URL from M }

C.    List_senders = { S }

D.    List_messages = { M }

E.    List_URLs = { URL from M }

LOOP

F.    New_Senders = find the senders who sent message with URLs that match one in New URL G.    New_messages = messages from New_Senders with shortened URLs H.    New_URLs = { URLs from New_messages } not in List_URLs I.    List_senders = List_senders U New_Sender J.    List_messages = List_messages U New_messages K.    List_URLs = List_URLs U New_URLs L.    If not empty (New_URLs) goto Step F

GENERATE OUTPUT_APPROX_CLIQUE

M.    Output_approx_clique = NULL

N.    For each URL in List_URLs a.    X = Count how many distinct senders in List_senders sent a message with URL b.    If X >= threshold then i.    Add the URL / Sender (URL) / Messages (URL) to Output_approx_clique O.    END-For

*FIG. 5* processing Logs/post.204_03_20.small.logs

ITERATION 1
=============
List_URL        1 URLs
List_senders    10 senders

ITERATION 2
=============
List_URL        50 URLs
List_senders    39 senders

ITERATION 3
=============
List_URL        199 URLs
List_senders    79 senders

ITERATION 4
=============
List_URL        409 URLs
List_senders    103 senders

ITERATION 5
=============
List_URL        509 URLs
List_senders    110 senders

ITERATION 6
=============
List_URL        517 URLs
List_senders    114 senders

ITERATION 7
=============
List_URL        542 URLs
List_senders    117 senders

ITERATION 8
=============
List_URL        559 URLs
List_senders    120 senders

ITERATION 9
=============
List_URL        565 URLs
List_senders    120 senders

```
final output                    501
=============
hxxp://po.st/04u50w                 senders : 10
    109409141                       (also sent hxxp://po.st/kRVgP3)
    134223662                       (also sent hxxp://po.st/PWYxeb hxxp://po.st/QkPEEF)
    408780336                       (also sent hxxp://po.st/9TZmmS)

hxxp://po.st/9TZmmS                 senders : 8
    408780336                       (also sent hxxp://po.st/04u50w)
    523842769                       (also sent hxxp://po.st/WidtOL)
    567011387                       (also sent hxxp://po.st/PWYxeb)

hxxp://po.st/kRVgP3                 senders : 8
    109409141                       (also sent hxxp://po.st/04u50w)
    363614046                       (also sent hxxp://po.st/u6DUgv)
                                                                            502
hxxp://po.st/PWYxeb                 senders : 3
    134223662                       (also sent hxxp://po.st/04u50w hxxp://po.st/QkPEEF)
    567011387                       (also sent hxxp://po.st/9TZmmS)
                                                                            503
hxxp://po.st/QkPEEF                 senders : 10
    134223662                       (also sent hxxp://po.st/04u50w hxxp://po.st/PWYxeb)

hxxp://po.st/RHX2E4                 senders : 3
    380639048                       (also sent hxxp://po.st/WidtOL)
    759295987                       (also sent hxxp://po.st/u6DUgv)

hxxp://po.st/rprN8U                 senders : 3
    374283002                       (also sent hxxp://po.st/u6DUgv)

hxxp://po.st/u6DUgv                 senders : 10
    363614046                       (also sent hxxp://po.st/kRVgP3)
    374283002                       (also sent hxxp://po.st/rprN8U)
    759295987                       (also sent hxxp://po.st/RHX2E4)

hxxp://po.st/WidtOL                 senders : 20
    380639048                       (also sent hxxp://po.st/RHX2E4)
    523842769                       (also sent hxxp://po.st/9TZmmS)
```

*FIG. 6B*

IDENTIFICATION OF MALICIOUS SHORTENED UNIFORM RESOURCE LOCATORS

BACKGROUND OF THE INVENTION

1. Field of the Invention

The present invention relates generally to computer security and more particularly but not exclusively to methods and apparatus for identifying malicious shortened uniform resource locators.

2. Description of the Background Art

As its name implies, uniform resource locator (URL) shortening involves shortening the character length of a URL. For example, a URL <<http://testurl.org/home/places/testpage>> of a webpage may be shortened to <<http://shorturl.com/xxxx>>, where "shorturl.com" is the domain name of the URL shortening service and "xxxx" is a unique key that identifies the full URL of the webpage, i.e., <<http://testurl.org/home/places/testpage>>. A reference to the short URL is redirected to the full URL. For example, a web browser that is pointed to <<http://shorturl.com/xxxx>> will be redirected to <<http://testurl.org/home/places/testpage>>. Examples of the many publicly available URL shortening service on the Internet include "bit.ly", "t.co", "tinyurl.com", "goo.gl", "ow.ly", "dlvr.it", "is.gd", "j.mp", "migre.me", "dld.bz", "lnk.ms", "wp.me", "tiny.ly", "twurl.nl", "su.pr", "3.ly", "post.ly", "tiny.cc", "durl.me", and "adf.ly."

While useful in many web applications, URL shortening raises significant computer security issues. Many computer security mechanisms, such as web reputation systems, spam filters, and anti-advanced persistent threat (APT) modules, need to know the full URL of a web content to determine whether or not the web content or the full URL is malicious. URL shortening makes it relatively difficult for these security mechanisms to fully evaluate links that have shortened URLs.

SUMMARY

In one embodiment, malicious shortened uniform resource locators are identified by collecting online messages in a computer. Senders and uniform resource locators are extracted from the collected online messages. Sender controlled components are identified in the uniform resource locators. Groups of sender controlled components and senders are formed. Shortened uniform resource locators associated with sender controlled components that are members of malicious groups are identified as malicious.

These and other features of the present invention will be readily apparent to persons of ordinary skill in the art upon reading the entirety of this disclosure, which includes the accompanying drawings and claims.

DESCRIPTION OF THE DRAWINGS

FIG. 5 shows an example pseudo-code for forming approximate bipartite cliques in accordance with an embodiment of the present invention.

FIG. 6, which consists of FIGS. 6A and 6B, shows a sample output of processing tweet messages.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
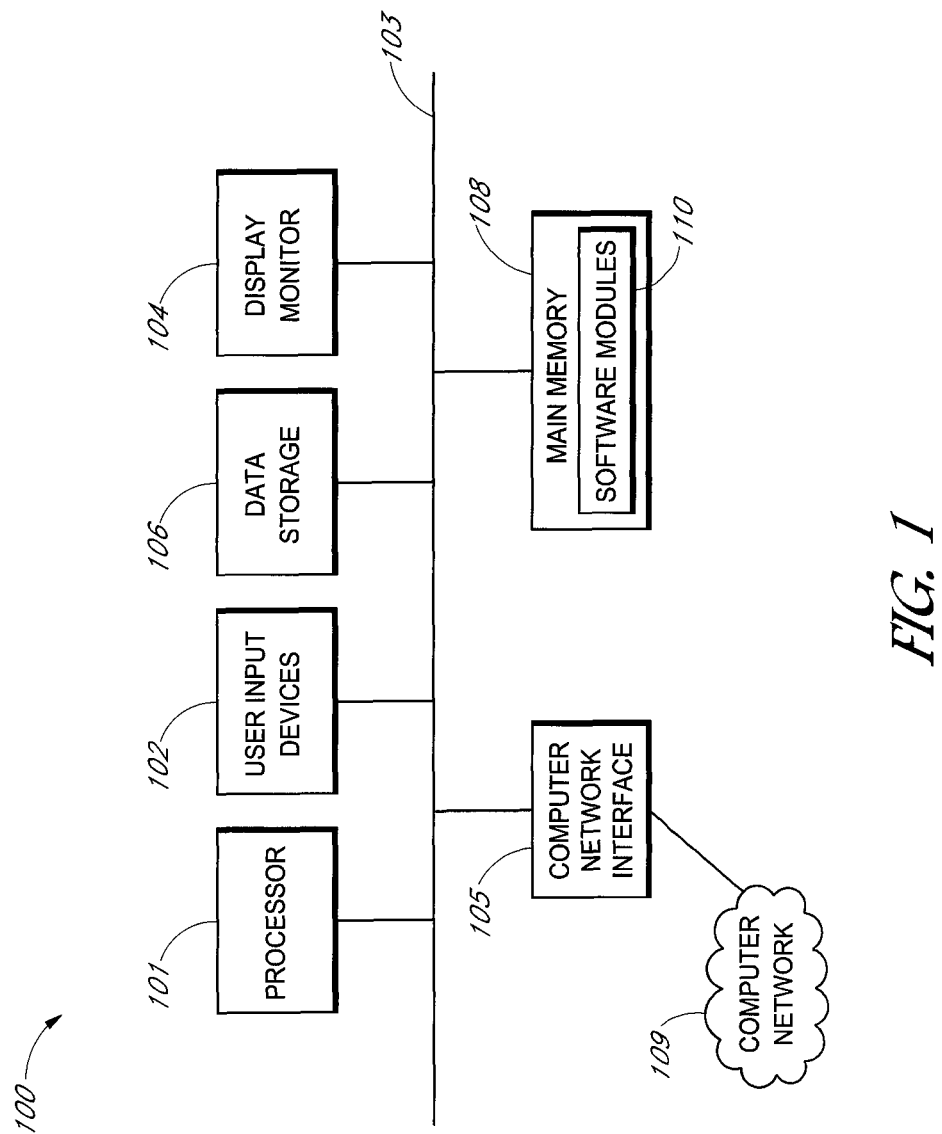
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as a backend system or other computers described below. The computer 100 may have fewer or more components to meet the needs of a particular application. The computer 100 may include one or more processors 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. As an example, the software modules 110 may comprise analysis modules when the computer 100 is employed as a backend system.

The computer 100 may be configured to perform its functions by executing the software modules 110. The software modules 110 may be loaded from the data storage device 106 to the main memory 108. An article of manufacture may be embodied as computer-readable storage medium including instructions that when executed by the computer 100 causes the computer 100 to be operable to perform the functions of the software modules 110.

Figure 2:
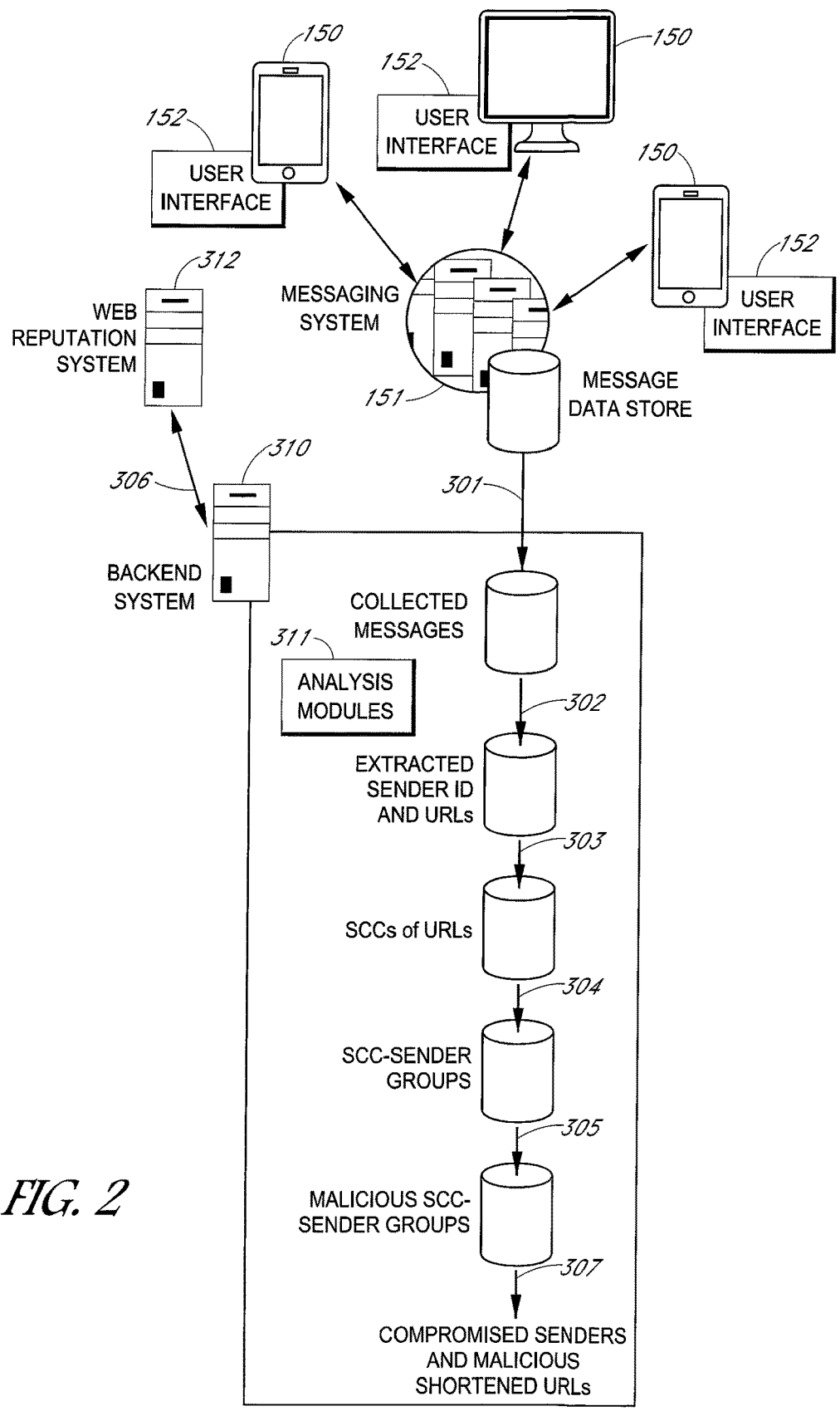
FIG. 2 shows a schematic diagram of a system for identifying malicious shortened uniform resource locators in accordance with an embodiment of the present invention.

FIG. 2 shows a schematic diagram of a system for identifying malicious shortened URLs in accordance with an embodiment of the present invention. In the example of FIG. 2, a messaging system 151 may comprise one or more computers that provide a social networking service, a blogging service, an email service, or other online service where users may send or receive messages. As a particular example, the messaging system 151 may be that of the FACEBOOK or TWITTER social networking service. As another example, the messaging system 151 may be an online review website, a blogging website, an online newspaper website, or other site where a user may submit a message, such as by entering text on a comment webpage.

Yet another example, the messaging system 151 may comprise an email server, mail transfer agent, or other system for sending and receiving emails.

Messages submitted over the Internet are also referred to herein as "online messages." An online message may comprise an email or a posting on a webpage. An online message may also be a tweet message sent by way of the TWITTER social networking site. A tweet message is typically a short (e.g., 140-character or less) text message sent by Short Message Service (SMS) over a mobile phone network. A tweet message may also be sent over the Internet by way of a web interface, e.g., by using a web browser to communicate with the TWITTER social networking site. Some social networking services are peer-to-peer (e.g., PEERSON social network), in which case online messages are sent directly between user devices, such directly between computers 150.

A computer 150 may comprise a computer employed by a user to access the service provided by the messaging system 151. For example, the computer 150 may comprise a mobile phone or other mobile computing device (e.g., tablet computer). The computer 150 may also be a desktop, a laptop, or other user computer. The computer 150 may include a user interface 152 for accessing the messaging system 151, such as a web browser, dedicated client software (e.g., social networking app), SMS user interface for communicating with the messaging system 151, peer-to-peer software, email client software, etc. The computers 150 may communicate with the messaging system 151 over a mobile phone network in the case of a tweet message sent by SMS. The computers 150 may also communicate with the messaging system 151 over the Internet. In the case of a peer-to-peer social networking service, the computers 150 may communicate directly with each other without going through the messaging system 151 depending on the topology of the social network infrastructure.

Messaging systems on the Internet are vulnerable to being abused. For example, a social networking account, i.e., an account with a social networking service, may be used to send malicious online messages, such as a spam or phishing online message. The malicious online message may be sent by its registered owner or by someone who hijacked the social networking account from its registered owner. A malicious online message is especially dangerous when sent by way of a social networking service because social messages are typically received from a sender that is associated with the recipient. More specifically, a social message is typically from someone that the recipient knows, such as a friend of the recipient or someone being followed by the recipient. Therefore, the recipient is much more likely to fall victim to malicious online messages sent by way of a social networking service. In addition, social messages are typically received in mobile phones, which often do not have the requisite computing resources to run a proper antivirus/antispam or other computer security modules.

A backend system 310 may compromise one or more computers employed for receiving online messages, extracting sender identifiers and URLs from the online messages, identifying a sender controlled component of a URL, creating groups of sender controlled components and senders (e.g., by forming approximate bipartite cliques), determining whether or not a group of sender controlled components and senders is malicious, and deeming a shortened URL associated with a sender controlled component that is a member of a malicious group of sender controlled components and senders to be a malicious URL. The backend system 310 may send information about identified malicious shortened URLs to web reputation systems, spam filters, and other computer security systems, for example.

In the example of FIG. 2, the backend system 310 includes analysis modules 311. In one embodiment, the analysis modules 311 comprise software modules for identifying or facilitating identification of shortened malicious URLs. The analysis modules 311 may include scripts, a web browser, statistical and graph analysis software, parser, interface for communicating with a remote computer (e.g., web reputation system 312, messaging system 151), and other software.

In the example of FIG. 2, the system for identifying malicious shortened URLs includes a web reputation system 312. The web reputation system 312 may comprise the TREND MICRO web reputation system, for example. Other web reputation systems may also be employed without detracting from the merits of the present invention. Generally speaking, a web reputation system comprises one or more computers that host a web reputation database containing information on known malicious and known legitimate (i.e., non-malicious) websites and other hosts on the Internet. In the example of FIG. 2, the web reputation system 312 may be consulted to determine the reputation of a uniform resource locator (URL), such as whether the URL is known to be malicious, known to be legitimate, or has an unknown reputation. The web reputation system 312 may also provide a category of a known malicious URL, such whether the malicious URL links to a phishing site, spamming site, etc. The backend system 310 may communicate with the web reputation system 312 and the messaging system 151 over the Internet.

In an example operation, a sampling of online messages may be collected in the backend system 310 (arrow 301). The collected online messages may be from the messaging system 151 or other data store of online messages, such as a computer 150 that participates in peer-to-peer social networking. The collected online messages may be tweet messages, webpages, or emails, for example. A sender identifier (ID) and one or more URLs are extracted from each of the online messages (arrow 302). The URLs may be extracted from links included in the online messages. The sender ID may be an account ID (e.g., a user ID of a TWITTER social networking account), an Internet Protocol (IP) address, or an email address, for example.

A sender controlled component (SCC) is the smallest unit of a URL that allows the sender to control the URL. Identification of an SCC of a URL thus involves extracting a portion of the URL that identifies a web content being linked to. The SCC is the minimum amount of characters in the URL needed to identify the web content.

In the case of shortened URLs, the SCC may be the original URL with "the http:" or "https:" removed. Generally speaking, the reduction and expansion of URLs are done in a manner consistent with the ways that URLs are interpreted on the World Wide Web ("web"). Typically, the order of reduction is to remove URL paths first, then remove hosts, and eventually getting down to the domain name or to the host on the domain name if the URL is on some web hosting or blog platform. In the case where the links being processed are URLs, the SCCs of URLs may be identified as shown in Table 1.

TABLE 1

| URL | SCC |
| --- | --- |
| http://www.trendmicro.com/page1.html | trendmicro.com |
| http://po.st/XXXXXX | po.st/XXXXXX |
| http://xxx.blogspot.com/page556.html | xxx.blogspot.com |
| http://yyy.blogspot.com/page556.html | yyy.blogspot.com |

In the example of Table 1, the SCC of the URL <<http://www.trendmicro.com/page1.html>> is "trendmicro.com", the SCC of the URL <<http://po.st/XXXXXX>> is "po.st/XXXXXX", etc.

Continuing the example of FIG. 2, the SCCs of URLs from links in the collected online messages are identified (arrow 303). Groups of SCCs and senders are thereafter formed (arrow 304). In one embodiment, groups of SCCs and senders are formed by approximate bipartite clique. In that embodiment, a bipartite clique is a group of SCCs and senders. For example, the collected online messages may be graphed by identifying online messages that contain one or more links with URLs, identifying the SCCs of the URLs, and connecting SCCs to senders (e.g., by sender ID) that sent the online messages containing the URLs. Approximate bipartite cliques may be identified from the resulting graph, with each bipartite clique representing a single group of SCCs and senders. That is, a group of SCCs and senders (also referred to as an "SCC-sender group") may be a bipartite clique that has SCCs and senders as members. Other grouping techniques may also be employed without detracting from the merits of the present invention.

Figure 3:
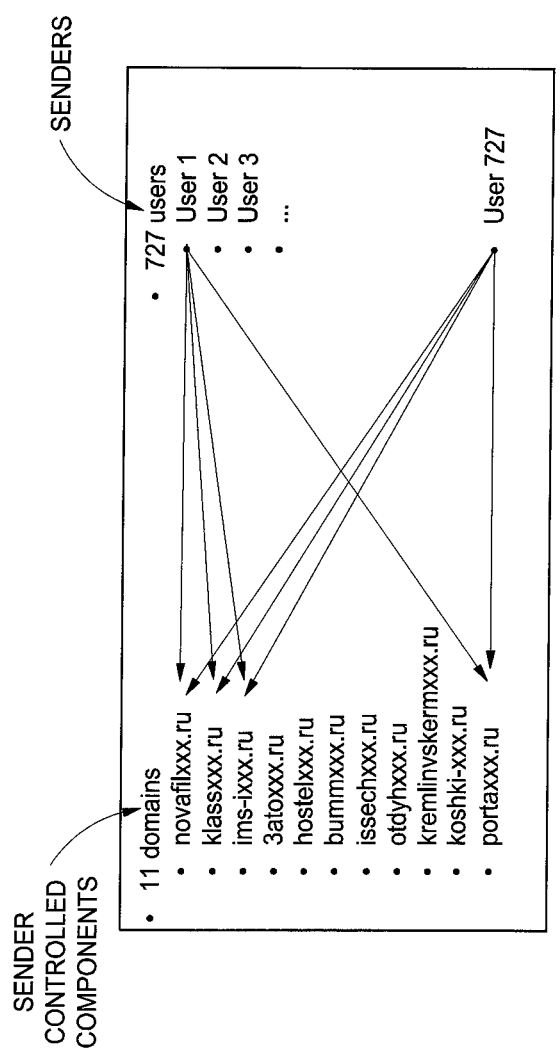
FIG. 3 shows a schematic diagram of an example of a bipartite clique.

Creating groups of SCCs and senders by bipartite cliques is advantageous in that if a group of senders that have sent malicious online messages containing the same SCCs are found, then it is very likely that any URL associated with an SCC included in the same group is also malicious. It is to be noted that a URL is referred to herein as being associated with an SCC when the SCC is identified from, and is thus included in, the URL. FIG. 3 shows a schematic diagram of an example of a bipartite clique consisting of 11 SCCs and 727 malicious senders. A shortened URL associated with any of the 11 SCCs of FIG. 3 may be deemed to be malicious.

Continuing the example of FIG. 2, each of the groups of SCCs and senders is evaluated to determine if any of the groups is malicious (arrow 305). A malicious SCC-sender group has senders that send spam online messages, send phishing online messages, or perform other malicious behavior. An SCC-sender group may be deemed malicious based on one or more criteria indicative of malicious behavior.

One criterion for determining whether or not an SCC-sender group is malicious is the probability of a set of senders creating an approximate bipartite clique structure in a non-automated way, i.e., the probability that senders in the set are not sending machine-generated online messages. Various statistical approaches may be employed to estimate the probability without detracting from the merits of the present invention (e.g., a Bayesian approach may be used to evaluate the Bayes factor of the approximate clique). For example, the distribution of link locations of typical senders may be evaluated. If senders belonging to an SCC-sender group are acting in a way that is extra-ordinarily unlikely given typical user behavior, then the senders in the SCC-sender group are most likely sending online messages by automated methods. Because machine-generated online messages are typically malicious, the senders in the SCC-sender group may be deemed to be compromised. A sender (i.e., an IP address, social networking account, etc.) is deemed compromised when it has been hijacked from its owner or is being used by its owner to perform malicious activities. For example, a sender account is compromised when the account is employed to perform an illegal or unauthorized activity, such as sending spam messages. As another example, an account is compromised when some malware or malicious application performs malicious actions using the account without the owner's authorization, as in the case when the owner is a victim of phishing or some drive-by install.

Another criterion for determining whether or not an SCC-sender group is malicious is whether any of its senders has a history of sending malicious online message. As a particular example, URLs of online messages sent by a sender in the past may be sent to the web reputation system 312 to determine the reputations of the URLs (arrow 306). The web reputation system 312 may indicate whether or not a URL is known to be a malicious URL. An SCC-sender group with a sender that sent online messages with a malicious URL may be deemed to be malicious.

Another criterion for determining whether or not an SCC-sender group is malicious is whether any URL associated with an SCC in the SCC-sender group is in a blacklist, which is a listing of known malicious URLs. For example, URLs may be extracted from online messages and sent to the web reputation system 312 to determine if any of the URLs is included in a blacklist (arrow 306). An SCC-sender group that includes an SCC from a URL that is listed in a blacklist may be deemed to be malicious.

Senders and URLs associated with SCCs of a malicious SCC-sender group may be deemed to be compromised senders and malicious URLs, respectively (arrow 307). Because the SCCs capture shortened URLs, the malicious URLs may be malicious shortened URLs. In one embodiment where the collected online messages are grouped into bipartite cliques, a shortened URL associated with an SCC that is a member of a malicious bipartite clique may be deemed to be a malicious shortened URL. In that embodiment, a sender that is a member of the malicious bipartite clique is deemed to be a compromised sender. Accordingly, an IP address, account ID, email address or other identifier of the sender may be deemed to be compromised.

Figure 4:
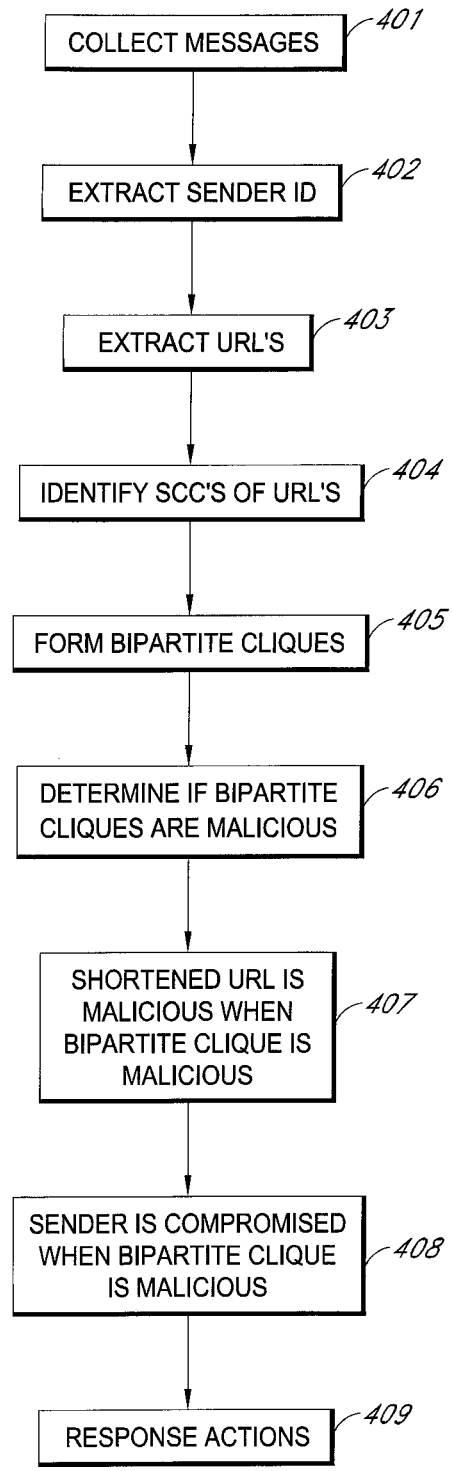
FIG. 4 shows a flow diagram of a method of identifying malicious shortened URLs in accordance with an embodiment of the present invention.

FIG. 4 shows a flow diagram of a method of identifying malicious shortened URLs in accordance with an embodiment of the present invention. The method of FIG. 4 may be performed using the backend system 310 of FIG. 2. Other systems or components may also be employed without detracting from the merits of the present invention.

In the example of FIG. 4, a sampling of online messages are collected (step 401). The online messages may comprise webpages, emails, or tweet messages, for example. As a particular example, the sampling may be collected spam emails.

Sender IDs are extracted from the collected online messages (step 402). A sender ID may comprise an IP address, an account ID, an email address, or other information that identifies the sender of the online message. URLs are extracted from links included in the collected online messages (step 403). The SCC of each extracted URL is identified (step 404). By processing at the level of an SCC, the extracted URLs being evaluated may be shortened URLs, malicious URLs of legitimate but compromised webservers, URLs of malicious hosts on free web-hosting services, and URLs of domains owned by cybercriminals, to name some examples. The granularity of the SCC advantageously allows for evaluation of shortened URLs as well as different URLs.

In the example of FIG. 4, the collected online messages are grouped into one or more bipartite cliques (step 405). In one embodiment, each of the bipartite cliques is an approximate bipartite clique because of the limited amount of data from which the bipartite cliques are formed. Full bipartite cliques may also be formed when a large amount of data (online messages in this example) are available for processing into bipartite cliques.

Each of the bipartite cliques represents a single group of SCCs and senders. FIG. 5 shows an example pseudo-code for forming approximate bipartite cliques in accordance with an embodiment of the present invention. The pseudo-code of FIG. 5 may be implemented as a LINUX shell script, for example. The pseudo-code of FIG. 5 generates an output approximate bipartite clique containing members with shortened URLs, with the shortened URLs being sent by a number of senders that is equal to or greater than a threshold. The threshold may be as low as 2; the threshold may be increased to form stronger bipartite cliques. The threshold might be a function of the number of senders and/or the number of SCCs or other data about the messages and senders.

FIG. 6, which consists of FIGS. 6A and 6B, shows a sample output from processing 4,040 shortened URLs from tweet messages collected from the TWITTER social networking site (e.g., from <<https://dev.twittercom/docs/api/1.1/get/statuses/sample>>). The final output of FIG. 6 (FIG. 6B) is a bipartite clique formed from the collected tweet messages. Other bipartite cliques that were formed are not shown for clarity of illustration. The bipartite cliques are approximate bipartite cliques because of the relatively low number of tweet messages that were processed.

The bipartite clique in the sample final output of FIG. 6 includes 10 senders that sent the shortened URL <<hxxp://po.st/04u50w>> (see FIG. 6B, arrow 501); 3 of these 10 senders also sent shortened URLs that have also been flagged in the bipartite clique. These 3 senders have the sender ID's "109409141", "134223662" and "408780336". In particular the sender "109409141" also sent an online message that had the shortened URL <<hxxp://po.st/kRVgP3>> (see FIG. 6B, arrow 502). The sender "134223662" sent online messages with 2 other shortened URLs that were flagged as being a member of the bipartite clique (see FIG. 6B, arrows 503 and 504).

Continuing with the example of FIG. 4, the bipartite cliques are evaluated to determine if any of them is malicious (step 406). The bipartite cliques may be evaluated using the above-described criteria indicative of malicious behavior. Other criteria or techniques for identifying malicious behavior may also be employed without detracting from the merits of the present invention. The shortened URLs associated with SCCs of a malicious bipartite clique may be deemed to be malicious (step 407). The senders of a malicious bipartite cliques may be deemed to be compromised. (step 408).

For example, in the case where the collected online messages are spam emails, the IP addresses of the senders may be deemed to be compromised and the shortened URLs included in the spam emails may be deemed to be malicious. As another example, in the case where the collected online messages are tweet messages, the social networking account of the senders may be deemed to be compromised and the shortened URLs included in the tweet messages may be deemed to be malicious. Yet another example, in the case where the collected online messages are webpages of a social networking service, the social networking account of the senders may be deemed to be compromised and the shorted URLs included in postings of the senders may be deemed to be malicious.

Actions responsive to identification of malicious senders and malicious shortened URLs may be performed (step 409). Such response actions may include distributing information on the malicious senders and malicious shortened URLs to web reputation systems, URL filters, etc.

Methods and systems for identifying malicious shortened URLs have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of identifying malicious shortened uniform resource locators, the method comprising executing on a processor of a computer the steps of:
   receiving online messages in the computer;
   extracting sender identifiers and shortened uniform resource locators from the online messages;
   forming the online messages into a plurality of groups, each group in the plurality of groups comprising senders extracted from the online messages and shortened uniform resource locators extracted from the online messages, wherein in each group in the plurality of groups a plurality of senders have sent a same shortened uniform resource locator;
   identifying a malicious group in the plurality of groups;
   deeming an identified shortened uniform resource locator that is a member of the malicious group to be malicious; and
   alerting another computer that the identified shortened uniform resource locator is malicious.

2. The method of claim 1, wherein the online messages comprise emails.

3. The method of claim 2, wherein the steps executed on the processor of the computer further include:
   deeming an Internet protocol (IP) address of a sender that is a member of the malicious group to be compromised.

4. The method of claim 1, wherein the online messages comprise tweet messages.

5. The method of claim 4, wherein the steps executed on the processor of the computer further include:
   deeming a social networking account of a sender that is a member of the malicious group to be compromised.

6. The method of claim 1, wherein each group in the plurality of groups comprises a bipartite clique.

7. The method of claim 1, wherein the online messages are received by the computer over the Internet.

8. The method of claim 1, wherein the sender identifiers extracted from the online messages comprise social networking accounts.

9. The method of claim 1, wherein the sender identifiers extracted from the online messages comprise IP addresses.

10. A method of identifying a malicious shortened uniform resource locator, the method comprising executing on a processor of a computer the steps of:
    receiving online messages in the computer;
    extracting shortened uniform resource locators from the online messages;
    identifying sender controlled components from the shortened uniform resource locators;
    forming a plurality of bipartite cliques, each of the plurality of bipartite cliques comprising senders and sender controlled components identified from shortened uniform resource locators that are included in online messages sent by the senders, wherein in each bipartite clique in the plurality of bipartite cliques a plurality senders have sent a same shorted uniform resource locator;
    finding that a particular bipartite clique in the plurality of bipartite cliques is malicious; and
    detecting an identified shortened uniform resource locator that is associated with a sender controlled component that is a member of the particular bipartite clique to be malicious.

11. The method of claim 10, wherein the online messages comprise emails.

12. The method of claim 11, wherein the steps performed on the processor further include detecting an Internet protocol (IP) address of a sender that is a member of the particular bipartite clique to be compromised.

13. The method of claim 10, wherein the online messages comprise tweet messages.

14. The method of claim 13, wherein the steps performed on the processor further include detecting a social networking account of a sender that is a member of the particular bipartite clique to be compromised.

15. The method of claim 10, wherein the online messages are received by the computer over the Internet.

16. A system comprising:
a backend system comprising a processor and a memory, wherein the processor executes instructions in the memory to:
receive online messages,
extract sender identifiers and shortened uniform resource locators from the online messages,
identify sender controlled components in the shortened uniform resource locators,
form the online messages into a plurality of groups that each comprises senders extracted from the online messages and sender controlled components associated with shortened uniform resource locators extracted from the online messages, wherein in each group in the plurality of groups a plurality of senders have sent a same shortened uniform resource locator,
find a malicious group in the plurality of groups,
deem an identified shortened uniform resource locator associated with a sender controlled component that is a member of the malicious group to be malicious,
and alert another computer that the identified shortened uniform resource locator is malicious.

17. The system of claim 16, wherein the online messages comprise emails.

18. The system of claim 16, wherein the online messages comprise tweet messages.

19. The system of claim 16, wherein the backend system receives the online messages from a messaging system over the Internet.

20. The system of claim 16, further comprising a web reputation system in communication with the backend system to determine a reputation of a uniform resource locator.

* * * * *